United States Patent [19]

Liu et al.

[11] Patent Number: 4,842,756

[45] Date of Patent: Jun. 27, 1989

[54] MULTIFUNCTIONAL VISCOSITY INDEX IMPROVER

[75] Inventors: Christopher S. Liu, Poughkeepsie; Maria M. Kapuscinski, Carmel; Larry D. Grina, Wappingers Falls; Ronald E. Jones, Glenham, all of N.Y.

[73] Assignee: Texaco Inc., White Plains, N.Y.

[21] Appl. No.: 28,850

[22] Filed: Mar. 23, 1987

[51] Int. Cl.$^4$ ............................................ C10M 145/00
[52] U.S. Cl. ............................... 252/48.2; 252/51.5 R; 252/52 A; 252/56 R
[58] Field of Search .............. 252/52 A, 56 R, 51.5 R, 252/48.2

[56] References Cited

U.S. PATENT DOCUMENTS

| | | | |
|---|---|---|---|
| 3,842,010 | 10/1974 | Pappas et al. | 252/48.2 |
| 3,862,265 | 1/1975 | Steinkamp et al. | 252/56 R |
| 3,864,268 | 2/1975 | Culbertson et al. | 252/51.5 R |
| 4,388,202 | 6/1983 | Nagano et al. | 252/56 R |
| 4,557,847 | 12/1985 | Gutierrez et al. | 252/56 R |
| 4,632,769 | 12/1986 | Gutierrez et al. | 252/56 R |
| 4,707,285 | 11/1985 | Brewster et al. | 252/56 R |
| 4,732,942 | 3/1988 | Liu et al. | 252/56 R |

FOREIGN PATENT DOCUMENTS 254233  11/1962  Australia ............................ 252/48.2

*Primary Examiner*—William R. Dixon, Jr.
*Assistant Examiner*—Jerry D. Johnson
*Attorney, Agent, or Firm*—Robert A. Kulason; James J. O'Loughlin; Carl G. Seutter

[57] ABSTRACT

Lubricating oils of improved oxidative stability, dispersancy, and viscosity index contain ethylene-propylene copolymer bearing allyl glycidyl ether or glycidyl methacrylate graft monomer—which has been functionalized with 2,5-dimethyl aniline or 2,6-dimethyl morpholine.

8 Claims, No Drawings

MULTIFUNCTIONAL VISCOSITY INDEX IMPROVER

FIELD OF THE INVENTION

This invention relates to lubricating oils. More particularly it relates to lubricating compositions characterized by improved oxidative stability, dispersancy, and viscosity index.

BACKGROUND OF THE INVENTION

As is well known to those skilled in the art, it is possible to improve the properties of a lubricating oil by addition of various components. The viscosity index may be improved; the oxidative stability and dispersancy may be improved. Continued efforts are being made to attain improvement in these and other properties, and to attain these improvements at reduced cost. It is an object of this invention to provide an improved lubricating composition. Other objects will be apparent to those skilled in the art.

STATEMENT OF THE INVENTION

In accordance with certain of its aspects, this invention is directed to a method of preparing a polymer composition containing a carbon-carbon backbone and an epoxide moiety (through which antioxidant and/or dispersant functional groups may be incorporated into the molecule) pendant from said carbon-carbon backbone which comprises introducing into a polymer containing a carbon-carbon backbone, a first monomer containing ethylenic unsaturation and an epoxide moiety thereby forming a polymer composition containing a carbon-carbon backbone and an epoxide moiety pendant from said carbon-carbon backbone; and recovering said polymer composition containing a carbon-carbon backbone and an epoxide moiety (through which antioxidant and/or dispersant functional groups may be incorporated into the molecule) pendant from said carbon-carbon backbone.

DESCRIPTION OF THE INVENTION

THE POLYMER BACKBONE

The polymers which may be used in practice of this invention may include oil-soluble, substantially linear, carbon-carbon backbone polymers. Typical carbon-carbon backbone polymers prepared from monomers bearing an ethylenically unsaturated polymerizable double bond which may be employed include homopolymers or copolymers prepared from monomer

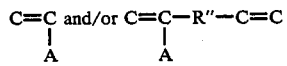

wherein A may be: hydrogen; hydrocarbon such as alkyl, aryl, etc.; RCOO—(such as acetate) or less preferred acyloxy (typified by —COOR); halide; etc. R" may be divalent hydrocarbon typified by alkylene, alkarylene, aralkylene, cycloalkylene, arylene, etc.

Ilustrative of such monomers may be acrylates or methacrylates; vinyl halides (such as vinyl chloride); styrene; olefins such as propylene, butylene, etc.; vinyl acetate; dienes such as butadiene, isoprene, hexadiene, ethylidene norbornene, etc. Homopolymers of olefins, (such as polypropylene, polybutylene, etc.), dienes, (such as hydrogenated polyisoprene), or copolymers of ethylene with e.g., butylene and higher olefins, styrene with isoprene and/or butadiene may be employed. The preferred carbon-carbon backbone polymers include those selected from the group consisting of ethylene-propylene copolymers (EPM or EPR) and ethylene-propylene-diene terpolymers (EPDM or EPT).

When the charge polymer is an ethylene-propylene copolymer (EPM, also called EPR polymers), it may be formed by copolymerization of ethylene and propylene under known conditions preferably Ziegler-Natta reaction conditions. The preferred EPM copolymers contain units derived from ethylene in amount of 40–70 mole %, preferably 50–60 mole %, say 55 mole %, the remainder being derived from propylene.

The molecular weight $\overline{M}_n$ of the EPM copolymers which may be employed may be 10,000–1,000,000, preferably 20,000–200,000, say 140,000. The molecular weight distribution may be characterized by a polydispersity index $\overline{M}_w/\overline{M}_n$ of less than about 15, preferably 1.2–10, say 1.6.

Illustrative EPM copolymers which may be employed in practice of the process of this invention may be those set forth in the following table, the first listed being preferred:

TABLE

A. The Epsyn brand of EPM marketed by Copolymer Rubber and Chemical Corporation containing 60 mole % of units derived from ethylene and 40 mole % of units derived from propylene, having a molecular weight $\overline{M}_n$ of 140,000 and a $\overline{M}_w/\overline{M}_n$ of 1.6.

B. The Epcar 505 brand of EPM marketed by B. F. Goodrich Co., containing 50 mole % of units derived from ethylene and 50 mole % of units derived from propylene and having a $\overline{M}_n$ of 25,000 and polydispersity index of 2.5.

C. The Esprene brand of EPR marketed by Sumitomo Chemical Co., containing 55 mole % of units derived from ethylene and 45 mole % of units derived from propylene and having a $\overline{M}_n$ of 25,000 and polydispersity index of 2.5;

When the charge polymer is a terpolymer of ethylene-propylene-diene (EPT or EPDM), it may be formed by copolymerization of ethylene, propylene and diene third monomer. The third monomer is commonly a non-conjugated diene typified by dicyclopentadiene; 1,4-hexadiene; or ethylidene norbornene. Polymerization is effected under known conditions generally comparable to those employed in preparing the EPM products. The preferred terpolymers contain units derived from ethylene in amount of 40–70 mole %, preferably 50–65 mole %, say 60 mole % and units derived from the propylene in amount of 20–60 mole %, preferably 30–50 mole %, say 38 mole % and units derived from third diene monomer in amount of 0.5–15 mole %, preferably 1–10 mole %, say 2 mole %. The molecular weight $\overline{M}_n$ of the terpolymers may typically be 10,000–1,000,000, preferably 20,000–200,000 say 120,000. Molecular weight distribution of the useful polymers is preferably narrow viz a $\overline{M}_w/\overline{M}_n$ of typically less than 15, preferably 1.5–10, say 2.2.

Illustrative EPT terpolymers which may be employed in practice of the process of this invention may be those set forth in the following table, the first listed being preferred:

TABLE

A. The Epsyn 4006 brand of EPT marketed by Copolymer Rubber and Chemical Corp., containing 58 mole % of units derived from ethylene, 40 mole % of units derived from propylene, and 2 mole % of units derived from ethylidene norbornene and having a $\overline{M}_n$ of 120,000 and polydispersity index $\overline{M}_w/\overline{M}_n$ of 2.2.

B. The Ortholeum 5655 brand of EPT marketed by Dupont containing 62 mole % of units derived from ethylene, 36 mole % of units derived from propylene, and 2 mole % of units derived from 1,4-hexadiene and having a $\overline{M}_n$ of 75,000 and a polydispersity index $\overline{M}_w/\overline{M}_n$ or 2.

C. The Ortholeum 2052 brand of EPT marketed by Dupont containing 62 mole % of units derived from ethylene, 36 mole % of units derived from propylene, and 2 mole % of units derived from 1,4-hexadiene and having a $\overline{M}_n$ of 35,000 and a polydispersity $\overline{M}_w/\overline{M}_n$ of 2.

D. The Royalene brand of EPT marketed by Uniroyal containing 60 mole % of units derived from ethylene, 37 mole % of units derived from propylene, and 3 mole % of units derived from dicyclopentadiene and having a $\overline{M}_n$ of 100,000 and polydispersity index $\overline{M}_w/\overline{M}_n$ of 2.5.

E. The Epsyn 40A brand of EPT marketed by Uniroyal containing 60 mole % of units derived from ethylene, 37 mole % of units derived from ethylene, 37 mole % of units derived from propylene, and 3 mole % of units derived from ethylidene norbornene and having a $\overline{M}_w$ of 140,000 and polydispersity index $\overline{M}_w/\overline{M}_n$ of 2.

Illustrative acrylate monomers which may be used in practice of the process of this invention may include the following (and the corresponding methacrylates), the first listed being preferred:

TABLE

A methyl acrylate
B propyl acrylate
C lauryl acrylate
D stearyl acrylate
E butyl acrylate

THE FIRST MONOMER

The first monomer which may be employed in practice of the process of this invention contains ethylenic unsaturation and an epoxide moiety.

Preferably the first monomer may be characterized by the formula:

wherein
C=C is ethylenically unsaturated double bond;
$R^v$ or $R^{vi}$ is a divalent hydrocarbon moiety selected from the group consisting of alkylene, alkarylene, aralkylene, cycloalkylene, and arylene;
R' is hydrogen or alkyl, alkaryl, aralkyl, cycloalkyl, or aryl;
R" is a divalent moiety selected from the group consisting of —COO— and —$R^v$—; and
a is an integer greater than 0;
b is an integer 0–1;
c is an integer 1–3; and
d is an integer 0–1.

In the above formula, R' may be hydrogen or a hydrocarbon selected from the group consisting of alkyl, aralkyl, cycloalkyl, aryl, and alkaryl, including such radicals when inertly substituted. When R is alkyl, it may typically be methyl, ethyl, n-propyl, iso-propyl, n-butyl, i-butyl, sec-butyl, amyl, octyl, decyl, octadecyl, etc. When R' is aralkyl, it may typically be benzyl, beta-phenylethyl, etc. When R' is cycloalkyl, it may typically be cyclohexyl, cycloheptyl, cyclooctyl, 2-methylcycloheptyl, 3-butycyclohexyl, 3-methylcyclohexyl, etc. When R' is aryl, it may typically be tolyl, xylyl, etc. R' may be inertly substituted i.e. it may bear non-reactive substituent such as alkyl, aryl, cycloalkyl, etc. Typically inertly substituted R' groups may include 4-methyl cyclohexyl, etc. the preferred R' groups may be lower alkyl, i.e. $C_1$–$C_{10}$ alkyl, groups including e.g. methyl, ethyl, n-propyl, i-propyl, butyls, amyls, hexyls, octyls, decyls, etc. R' may preferably be methyl.

In the above formula, $R^v$ or $R^{vi}$ may be a divalent hydrocarbon radical selected from the group consisting of alkylene, aralkylene, cycloalkylene, arylene, and alkarylene including such radicals when inertly substituted. When $R^v$ or $R^{vi}$ is alkylene, it may typically be methylene, ethylene, n-propylene, iso-propylene, n-butylene, i-butylene, sec-butylene, amylene, octylene, decylene, octadecylene, etc. When $R^v$ or $R^{vi}$ is aralkylene, it may typically be benzylene, beta-phenylethylene, etc. When $R^v$ or $R^{vi}$ is cycloalkylene, it may typically be tolylene, xylylene, etc. $R^{vi}$ may be inertly substituted i.e. it may bear a non-reactive substituent such as alkyl, aryl, cycloalkyl, ether, etc. Typically inertly substituted $R^v$ or $R^{vi}$ groups may include 2-ethoxyethylene, carboethoxymethylene, 4-methyl cyclohexylene, etc. The preferred $R^v$ or $R^{vi}$ groups may be lower alkyl, i.e. $C_1$–$C_{10}$ alkylene, groups including e.g. methylene, ethylene, n-propylene, i-propylene, butylene, amylene, hexylene, octylene, decylene, etc. $R^v$ and $R^{vi}$ may typically be methylene —$CH_2$— or n-propylene —$CH_2CH_2CH_2$—.

In the above formula, R" is a divalent moiety selected from the group consisting of —COO— and —$R^v$—. Preferably R" is —COO—.

a is an integer, greater than 0; and preferably a is 1. It is preferred that the double bond be not on the carbon atom which forms the epoxy ring. Preferably there is only one ethylenic double bond in the molecule; and when there are more, it is preferred that they be separated i.e. not adjacent or conjugated.

b is an integer 0–1. When b is 0 and d is 1, it will be apparent that the composition includes an ether moiety. When b is 1 and d is 0, the composition includes an ester moiety if R" is —COO—.

c is an integer 1–3. Preferably c is 1.

d is an integer 0–1. When b and d are both zero, the composition includes a hydrocarbon moiety.

In its preferred aspects, the first monomer may be characterized by the formula

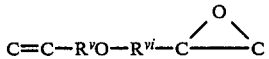

Typical first monomers may include the following, the first listed being preferred:

TABLE allyl glycidyl ether
glycidyl methacrylate 2-methallyl glycidyl ether
p-glycidyl styrene
styrene-p-glycidyl ether
3,4-epoxy-1-pentene
3,4-epoxy-1-butene

THE GRAFTING PROCESS

When the charge or base polymer is one which may be readily graft polymerized, as is the case with polymers typified by EPR or EPT polymers, then the first monomer may be introduced by graft polymerization.

The grafting of the graft monomer may be carried out by adding polymer to diluent-solvent in the reaction vessel which is then heated at 80° C.–160° C. to form a homogenous solution. There are then added graft monomer and free radical initiator in a molar ratio of monomer to initiator of 1:1–8:1, prefrably 1.5:1–5:1. Free radical initiators, such as dicumyl peroxide, dibenzoyl peroxide, di-t-butyl peroxide, dibenzoyl peroxide, di-t-butyl peroxide azobisisobutyronitrile, diacetyl peroxide, t-butyl peracetate, or diisopropyl peroxydicarbonate may be employed in the present process. The temperature of the solution is maintained above the decomposition temperature of the initiator for 0.25–5 hours, preferably 0.4–2 hours, under an inert atmosphere to form the desired product.

In a typical grafting reaction, a solution containing 25 parts of ethylene-propylene copolymer and 75 parts of solvent such as hexane or mineral oil is prepared. Then 2.5 parts of a graft monomer and 1 part of dicumyl peroxide are added and maintained in the presence of nitrogen at temperature of 155°±5° C. and atmospheric pressure (when mineral oil is a solvent) for 1 hour. Enough mineral oil is then added to obtain a fluid concentrate at room temperature. When the grafting is carried out in hexane, a stripping step is included.

The product graft polymer may contain 0.3–20 mole %, preferably 0.5–10 mole %, say 2 mole % derived from the graft monomer.

Typical configurations may include (when the graft monomer is glycidyl methacrylate):

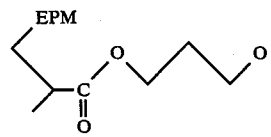

or when the graft monomer is allyl glycidyl ether:

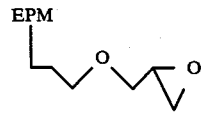

THE COPOLYMERIZATION PROCESS

When it is desired to utilize a polymer backbone or which the monomer is copolymerizable with first monomer, as is the case with polymers formed from acrylates or methacrylates, then the first monomer may be introduced by copolymerization.

This may be effected by adding first monomer, typified by allyl glycidyl methacrylate, and copolymerizable monomer(s) typified by methyl methacrylate or a mixture of lauryl methacrylate and stearyl methacrylate to the reaction vessel. The mole ratio of first monomer to copolymerizable monomers may be 0.02–0.3:1, preferably 0.05–0.2:1, say 0.1:1.

The reaction vessel contains inert diluent-solvent such as 145PPTS.HF oil in amount sufficient to yield a 50–90 w %, say 85 w % solution. There is also added 0.01–0.10 w %, say 0.06 w % (based on total monomer) of chain transfer agent —typically lauryl mercaptan. After purging with inert gas, typically nitrogen for 20–60 minutes, say 30 minutes, and heating to initiation temperature of 80° C.–100° C., say 83° C., there is added a first aliquot of 0.01–0.10 w %, say 0.036 parts of initiator, typically azobisisobutyronitrile (A1BN).

Reaction proceeds for 2–6 hours, say 3 hours at initiation temperature. There are then added a second aliquot (equal in amount to the first) of initiator and diluent, typically 100EPale oil to yield a mixture containing 30–70 w %, typically 50 w % of polymer. The reaction mixture is maintained at the temperature for 1–3 hours, say 1.5 hours; the temperature is then raised to 95° C.–130° C., say 100° C. for 30–240 minutes, say 60 minutes, after which the reaction mixture is cooled to room temperature.

THE FUNCTIONALIZING REACTANT

The functionalizing reactant which may be employed in practice of the process of this invention contains a zerewitnoff-active hydrogen and typically bears, an active group selected from the group consisting of $-NH_2$, $-NHR^{iv}$, $-OH$, $-COOH$, and $-SH$.

In the above compound $R^{iv}$ may be a hydrocarbon selected from the group consisting of alkyl, aralkyl, cycloalkyl, aryl, and alkaryl, including such radicals when inertly substituted. When $R^{iv}$ is alkyl, it may typically be methyl, ethyl, n-propyl, iso-propyl, n-butyl, i-butyl, sec-butyl, amyl, octyl, decyl, octadecyl, etc. When $R^{iv}$ is cycloalkyl, it may typically be cyclohexyl, cycloheptyl, cyclooctyl, 2-methylcycloheptyl, 3-butylcyclohexyl, 3-methylcylohexyl, etc. When $R^{iv}$ is aryl, it may typically be phenyl, naphtyl, etc. When $R^{iv}$ is alkaryl, it may typically be tolyl, xylyl, etc. $R^{iv}$ may be inertly substituted i.e. it may bear a non-reactive substituent such as alkyl, aryl, cycloalkyl, ether, etc. Typically inertly substituted $R^{iv}$ groups may include 2-ethoxyethyl, carboethoxymethyl, 4-methyl cyclohexyl, etc. The preferred $R^{iv}$ groups may be lower alkyl, i.e. $C_1$–$C_{10}$ alkyl, groups including e.g. methyl, ethyl, n-propyl, i-propyl, butyls, amyls, hexyls, octyls, decyls, etc. $R^{iv}$ may typically be n-propyl.

In its preferred aspects, the functionalizing reactant may be characterized by the formula $$HXR'''$$

In the above compound, $R'''$ may be a heterocyclic group or hydrogen or a heterocyclic group or a hydrocarbon radical selected from the group consisting of alkyl, aralkyl, cycloalkyl, aryl, and alkaryl, including such radicals when inertly substituted. When $R'''$ is alkyl, it may typically be methyl, ethyl, n-propyl, iso-propyl, n-butyl, i-butyl, sec-butyl, amyl, octyl, decyl, octadecyl, etc. When $R'''$ is aralkyl, it may typically be benzyl, beta-phenylethyl, etc. When $R'''$ is cycloalkyl, it may typically be cyclohexyl, cycloheptyl, cyclooctyl, 2-methylcycloheptyl, 3-butylcyclohexyl, 3-methylcyclohexyl, etc. When $R'''$ is aryl, it may typically be phenyl naphthyl, etc, $R'''$ may be inertly substituted i.e. it may bear a non-reactive substituent such as alkyl, aryl, cycloalkyl, ether, etc. Typically inertly substituted R''' groups may include 2-ethoxyethyl, carboethoxymethyl, 4-methylcyclohexyl, etc. The preferred hydrocarbon R''' groups may be lower alkyl, i.e. $C_1$–$C_{10}$ alkyl, groups including e.g. methyl, ethyl, n-propyl, i-propyl, butyls, amyls, hexyls, octyls, decyls, etc. When R''' is a hydrocarbon, it may typically be n-propyl.

When R''' is heterocyclic, it may typically be for example in the form of a five or six membered ring containing one or more heterocyclic non-carbon atoms such as N, O, S, etc. Illustrative rings may include furan, thiophene, pyrole, imidazole, thiazole, coumarone, thianaphthalene, indole, pyran, pyridine, quinoline, isoquinoline, morpholine, pyrimidine, piperazine, etc. including such rings when hydrogenated or inertly substituted. Preferred are the morpholine, piperazine and pyrimidine rings.

In the above compound, X may be —COO—, —S—, —$NR^{iv}$, —$NH^{iv}$, or —O—. The nitrogen or sulfur may be a portion of a heterocyclic ring; or it may be e.g. an —$NR^{iv}$ group pendent thereon.

Typical HXR''' compounds may be as follows:

TABLE

N-(3-aminopropyl) morpholine
morpholine
2,6-dimethyl morpholine
2-amino-3-picoline
4-amino-2,6-dimethyl pyrimidine
pyrimidine
N-hydroxyethyl piperazine
2-amino benzothiazole
N-methyl piperazine
N-(3-aminopropyl)-2-pipecoline
pyrrolidine
N-(3-aminopropyl) pyrrolidone
2-amino pyrimidine
2-mercapto pyrimidine
3-methylmercapto aniline
1(2-dimethylamino-ethyl-5-mercapto-tetrazole
2,5-dimethylaniline
tetrazole-1-acetic acid
hydrogen sulfide
methyl mercaptan
thiophenol Clearly more than one HXR''' compound may be present. Preferred of the above may be 2,5-dimethylaniline.

THE FUNCTIONALIZING PROCESS

Functionalization of the graft polymer so prepared may be carried out by adding functionalizing reactant to the graft polymer with agitation. Preferably the functionalizing reactant HXR''' is added in an amount substantially equivalent to the number of epoxy groups present in the graft polymer.

When HXR''' has a melting point above room temperature, it is preferable to carry out the reaction in a diluent-solvent having a boiling point of 80° C.–200° C. Typical solvents may include tetrahydrofuran, octanol, hexane, isopropanol, dioxane, N,N-dimethylacetamide, etc. The preferred solvents may be commercial tetrahydrofuran, octanol, or N,N-dimethyl acetamide. It should be noted that both the graft and the functionalizing (or coupling) reactions may be carried out in the same solvent; and this solvent may be hexane, cyclohexane, heptane, or an oil such as 145 PPTS HF oil or in Gulf 160 oil. The functionalization of these non-polymerizable monomers bearing Zerewitnoff-active hydrogen is carried out at 60° C.–150° C., say about 110° C. over 0.5–5 hours, say 2 hours. Although it may be possible to promote the functionalization by use of peroxide catalysts (such as dicumyl peroxide), it is preferred to initiate and promote the reaction by heart —at the noted temperature. The product is cooled to room temperature and may be used without further purification or treatment.

Reaction typically proceeds as follows (the polymer residue is designated as E for purpose of simplicity).

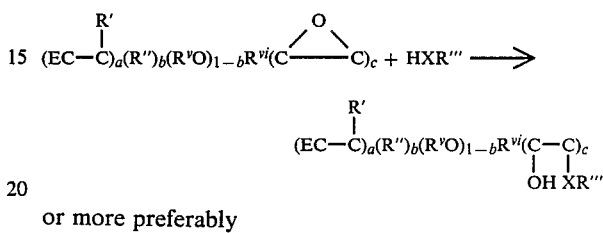

or more preferably

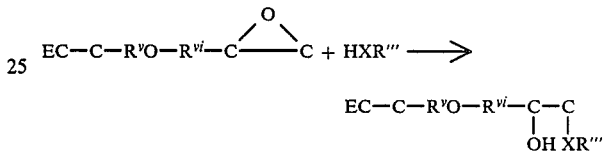

In a typical specific embodiment, the reaction may be:

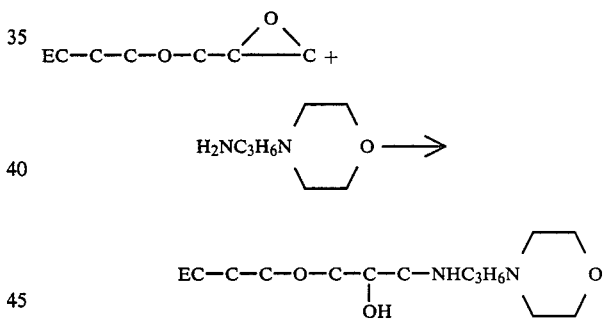

It appears that the functionalizing reactant becomes bonded to the molecule through the moiety derived from the graft monomer.

Illustrative products which may be prepared may include the following:

TABLE

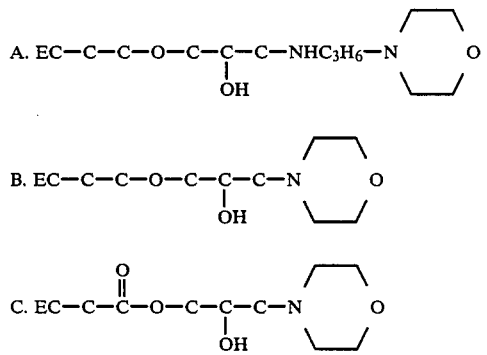

TABLE-continued

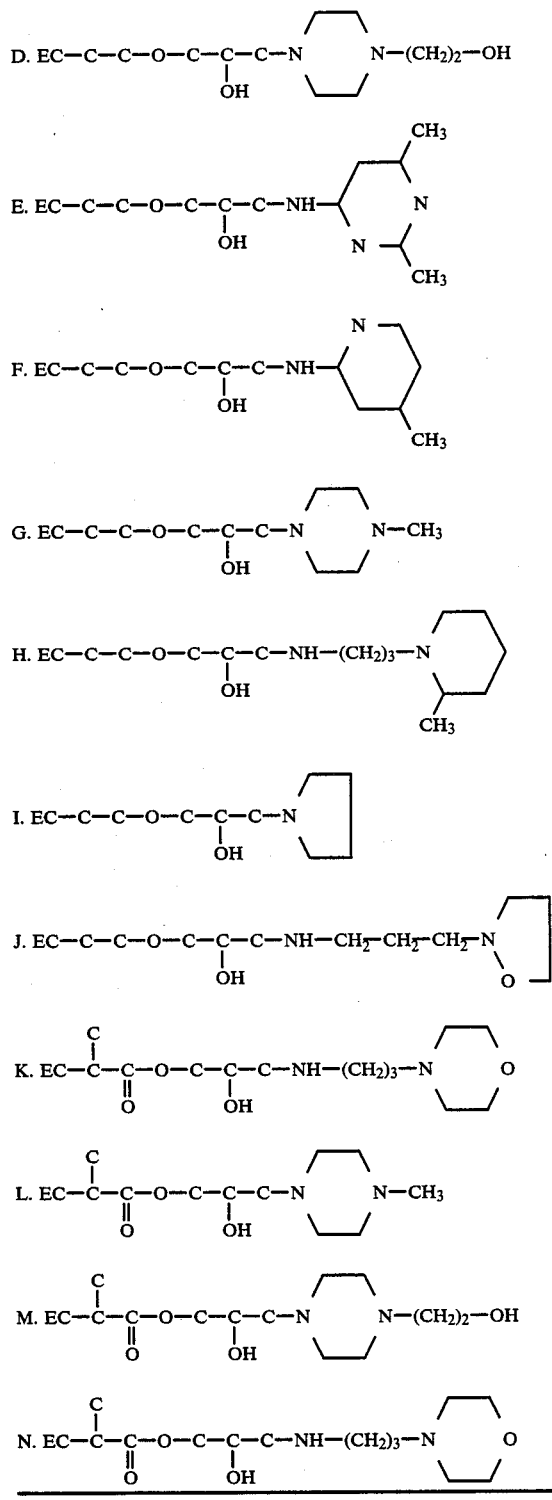

Specific illustrative products of the process of this invention may include the following:

TABLE

A. The Epsyn brand of EPM marketed by Copolymer Rubber and Chemical Corporation containing 60 mole % of units derived from ethylene and 40 mole % of units derived from propylene, having a molecular weight $\overline{M}_n$ of 140,000 and a $\overline{M}_n$ of 1.6, which has been grafted with glycidyl methacrylate to yield graft polymer containing 0.02 moles of epoxy groups per 1000 units of polymer molecular weight $\overline{M}_n$, and which has thereafter been functionalized with 2,6-dimethyl morpholine to yield product containing 0.02 moles of morpholine groups per 1000 units of polymer molecular weight $\overline{M}_n$.

B. The Epcar 505 brand of EPM marketed by B. F. Goodrich Co., containting 50 mole % of units derived from ethylene and 50 mole % of units derived from propylene and having a $\overline{M}_n$ of 25,000 and a polydispersity index of 2.5, which has been grafted with allyl glycidyl ether to yield graft polymer containing 0.02 moles of epoxy groups per 1000 units of polymer molecular weight $\overline{M}_n$, and which has thereafter been functionalized with 2,5-dimethyl aniline to yield product containing 0.02 moles of aniline groups per 1000 units of polymer molecular weight $\overline{M}_n$.

C. The Epsyn 4006 brand of EPT marketed by Copolymer Rubber and Chemical Corp., containing 58 mole % of units derived from ethylene, 40 mole % of units derived from propylene, and 2 mole % of units derived from ethylidene norbornene and having a $\overline{M}_n$ of 120,000 and a polydispersity index $\overline{M}_w/\overline{M}_n$ of 2.2, which has been grafted with allyl glycidyl ether to yield graft polymer containing 0.02 moles of epoxy groups per 1000 units of polymer molecular weight $\overline{M}_n$, and which has thereafter been functionalized with methyl mercapto aniline to yield product containing 0.02 moles of aniline groups per 1000 units of polymer molecular weight $\overline{M}_n$.

The novel polymer products of this invention are polymers containing a moiety derived from the graft monomer and the functionalizing monomer. It is a particular feature of this invention, when the product is to be used as a lubricating oil additive, that the polymer (ex graft and functionalizing components) be preferably one which is employed in lubricating oil to attain desired improvement e.g. as in viscosity index. Typical viscosity index improving polymers include polyolefins typified by EPR ethylene-propylene copolymers; EPT ethylene-propylene-third monomer (typically diene) polymers; ethylene-vinylacetate copolymers; polymethacrylates, etc.

The polymeric products of this invention may be added to lubricating oil compositions to impart thereto improvements in viscosity index and in dispersancy and in anti-oxidant properties. Typical lubricating oils to which the additives of this invention may be added include summer or winter automotive lubricating oils, airplane engine oils, railway diesel oils, etc. — whether hydrocarbon derived or synthetic. Typically the polymeric additive may be present in minor effective, viscosity index improving, amount of 0.1–20 w %, preferably 0.5–20 w %, say 1 w %. This may correspond to presence of groups derived from the functionalized graft monomer in amount of 0.01–0.6 w %, preferably 0.3–0.02 w %, say 0.08 w %.

Addition of the polymeric additive of this invention to a lubricating oil may be facilitated by use of a concentrate containing, 2–40 w %, say 9 w % of additive in a diluent-solvent which may in the preferred embodiment be the same as the lubricating oil in which the additive is to be formulated.

It is a feature of this invention that the improved lubricating oils are characterized by improved dispersancy as measured in the Bench VC Test. In the Bench VC Test, dispersancy relative to three references is tested. The reference blends are known to possess an excellent dispersancy, a good dispersancy, and a poor dispersancy. Better dispersants are characterized by lower ratings; and a rating at around the good standard is indicative of a promising candidate.

It is also a feature of this invention that the improved lubricating oils are characterized by improved anti-oxidancy as measured by the Bench Oxidation Test in which a 1.5 w % of test polymer in SNO-130 oil is blown with air while heated and stirred. Samples are withdrawn periodically for analysis by Differential Infrared Absorption (DIR) to observe changes in the carbonyl vibration band at 1710/cm. Higher carbonyl vibrational band intensity indicates a lower thermal-oxidative stability of the sample.

It is a particular feature of the lubricating oils of this invention that they are characterized by both improved dispersancy and antioxidancy while serving as superior viscosity index improvers.

DESCRIPTION OF THE SPECIFIC EMBODIMENT

Practice of this invention will be apparent to those skilled in the art from the following wherein as elsewhere in this application, all parts are parts by weight unless otherwise specified. In all formulae, all unfilled valence bonds may be filled with hydrogen atoms or with inert substituents.

Example I

In this example which represents the best mode presently known of carrying out the process of this invention, the polymer utilized is the Epsyn brand of EPR containing 55 mole % derived from ethylene and 45 mole % derived from propylene (having a $\overline{M}_n$ of 100,000). This polymer (100 parts) is added as a 20 w % solution in 145 PPTS HF oil to a reactor. The system is purged with nitrogen and heated to 155° C. There are then added 28 parts of allyl glycidyl ether graft monomer, as a 50 w % solution in 145 PPTS HF oil. Thereafter there is added 8 parts of dicumyl peroxide as a 25 w % solution in commercial hexane. The mixture is stirred at 155° C. for one hour to yield graft polymer containing approximately 0.9 moles of epoxy groups per 1000 units of polymer molecular weight $\overline{M}_n$. There is then added to the graft polymer so prepared, 15 parts of 2,5-dimethyl aniline functionalizing reactant as a 50 w % solution in 145 PPTS HF oil. This corresponds to 1 mole of 2,5-dimethyl aniline per epoxy group which has been grafted onto the charge polymer. The mixture is stirred at 155° C. for another hour.

Example II

In this Example, the procedure of Example I is duplicated except that (i) 10 parts of glycidyl methacrylate are added in place of the 28 parts of allyl glycidyl ether, (ii) the amount of dicumyl peroxide used in 5 parts, (iii) 10 parts of 2,6-dimethyl morpholine are added in place of the 15 parts of 2,5-dimethyl aniline.

Example III

In this Example, the procedure of Example I is duplicated except that (i) a mixture of 5 parts of allyl glycidyl ether and 5 parts of glycidyl methacylate are added in place of the 28 parts of glycidyl methacrylate, (ii) a mixture of 3.5 parts of morpholine and 6.5 parts of 3-methyl mercapto aniline is added in place of the 15 parts of 2,5-dimethyl aniline, (iii) the amount of dicumyl peroxide is 5 parts, and (iv) the reaction are carried out in 317 parts of commercial hexane in a Parr reactor instead of 145 PPTS oil.

Solvent hexane is then removed by exchange with SNO-100 oil by adding 1075 parts of SNO-100 oil and distilling off the hexane at 110° C. and 1–3 mmHg pressure for 2 hours. The final product contains 8.5 w % in SNO-100 oil.

Example IV

In this example, the procedure of Example III is duplicated except that (i) 5 parts of glycidyl methacrylate are added in place of the mixture of 5 parts of allyl glycidyl ether and 5 parts of glycidyl methacrylate (ii) 5 parts of 3-methyl mercapto aniline are added in place of the 6.5 parts of 3-methyl-mercapto aniline, and (iii) the amount of dicumyl peroxide is 2.5 parts.

Example V*

In this control example, the procedure of Example I is duplicated except that (i) 12 parts of glycidyl methacrylate are added in place of the 28 parts of allyl glycidyl ether, (ii) no 2,5-dimethyl aniline is added, and (iii) the amount of dicumyl peroxide added is 6 parts.

Example VI*

In this control example, set up for purposes of establishing a base for the Dispersancy Test, a 8.5 w % solution of the charge Epsyn polymer of Example I is prepared in SNO-100 oil.

The products of Examples I–VI were tested for dispersancy by the Bench VC Test (BVCT), at a concentration of 10 w % in a fully formulated oil having the following properties and components:

TABLE

| Component | Parts by Wt. |
|---|---|
| Solvent neutral oil A | 75.25 |
| Solvent neutral oil B | 21.64 |
| Zinc Dialkyldithiophosphate | 1.22 |
| 4,4'dinonyldiphenylamine | .39 |
| Overbased magnesium sulfonate | 1.50 |
| Silicone antifoamant | 150 PPM |
| Analyses | |
| Viscosity Kin 40C CS | 30.4 |
| Viscosity Kin 100C CS | 5.33 |
| Pour Point, °F. | +10 |
| Ash Sulfonated, % D874 | 0.88 |
| Phosphorus, % X-Ray | 0.12 |
| Sulfur, % X-Ray Total | 0.32 |
| Zinc, % X-Ray | 0.13 |
| Magnesium, % | 0.15 |
| CC Simulator-18C | 1400 |

Oil A had a sp. gr. 60°/60° F. of 0.858–0.868; Vis @ 100° F. of 123–133 SUS; Pour Point 0° F. Oil B had a sp. gr. 60°/60° F. of 0.871–0.887; Vis. @ 100° F. of 325–350SUS; Pour Point +10° F. Zinc salt is a salt of mixed alcohols—isopropanol and $P_2S_5$ product as described in U.S. Pat. No. 3,293,181. The overbased magnesium sulfonate had a TBN of 395 and is a salt of branched $C_{20}$–$C_{40}$ monoalkylbenzene sulfonic acid (MW 530–540) together with about 10% magnesium carbonate, 14% magnesium hydroxide and 4% magnesium sulfate.

The results are as follows:

TABLE

| Example | BVCT | Control |
|---|---|---|
| I | 31.0 | 12.5/32.3/56.5 |
| II | 37.6 | 15/49.8/63.3 |
| III | 31.7 | 12.5/40.4/60.7 |
| IV | 78.1 | 16.8/48.8/60.3 |
| V* | 94.1 | 10.7/30.4/58.9 |
| VI* | 99 | 10.7/30.4/58.9 |

From the above Table it will be apparent that the compositions of this invention (Examples I–III) are characterized by desirably low BVCT ratings which evidence desirably high degrees of dispersancy. Example V shows that presence of epoxy (without functionalizing monomer) is not sufficient to yield desired dispersancy. From the above, it will be apparent to those skilled in the art that the product of Example VI*, which was not functionalized at all, is not characterized by the desired degree of dispersancy.

In a further series of tests, the Oxidative Stability of Experimental Examples III and IV and control Example VI* were determined. This test correlates with the Sequence III D Test. (See ASTM Special Technical Publication 315H).

In this test, a solution containing 1.5 w % of test polymer in SNO-130 oil is blown with air while heated and stirred. Samples are withdrawn periodically for analysis by Differential Infrared Absorption (DIR) to observe changes in the carbonyl vibration band at 1710/cm. Higher carbonyl vibrational band intensity indicates a lower thermal-oxidative stability of the sample.

TABLE

| Time Hours | DIR Example VI | Example III | Example IV |
|---|---|---|---|
| 20 | 4.0 | 1.0 | 0.9 |
| 60 | 6.9 | 2.2 | 2.1 |
| 100 | 8.9 | 3.6 | 3.0 |
| 120 | 12 | 4.4 | 3.4 |

From the above Table, it is apparent that the Oxidative Stabilities of Examples III and IV of this invention are satisfactory and better than Example VI where no methyl mercapto aniline is added.

Example III shows for example that this formulation is particularly characterized by both outstanding dispersancy and anti-oxidancy in addition to its ability to serve as viscosity index improver.

Results comparable to those of Example I may be attained if the polymer is as follows:

TABLE

| Example | Polymer |
|---|---|
| VII | The Epsyn brand of EPM marketed by Copolymer Rubber and Chemical Corporation containing 60 mole % of units derived from ethylene and 40 mole % of units derived from propylene, having a molecular weight $\bar{M}_n$ of 140,000 and a $\bar{M}_w/\bar{M}_n$ of 1.6. |
| VIII | The Epcar 505 brand of EPM marketed by B.F. Goodrich Co., containing 50 mole % of units derived from ethylene and 50 mole % of units derived from propylene and having a $\bar{M}_n$ of 25,000 and a polydispersity index of 2.5. |
| IX | The Esprene brand of EPR marketed by Sumitomo Chemical Co., containing 55 mole % of units derived from ethylene and 45 mole % of units derived from propylene and having a $\bar{M}_n$ of 25,000 and polydispersity index of 2.5. |
| X | The Epsyn 4006 brand of EPT marketed by Copolymer Rubber and Chemical Corp., containing 58 mole % of units derived from ethylene, 40 mole % of units derived from propylene, and 2 mole % of units derived from ethylidene norbornene and having a $\bar{M}_n$ of 120,000 and a polydispersity index $\bar{M}_w/\bar{M}_n$ of 2.2. |
| XI | The Ortholeum 5655 brand of EPT marketed by DuPont containing 62 mole % of units derived from ethylene, 36 mole % of units derived from propylene, and 2 mole % of units derived from 1,4-hexadiene and having a $\bar{M}_w/\bar{M}_n$ of 2. |
| XII | Methyl methacrylate |
| XIII | Butyl methacrylate |
| XIV | Lauryl methacrylate |

Results comparable to those of Example I may be obtained if the functionalizing monomer is:

TABLE

| Example | Functionalizing Monomer |
|---|---|
| XV | N—hydroxyethyl piperazine |
| XVI | N—(3-aminopropyl) morpholine |
| XVII | N—methyl piperazine |
| XVIII | 2-amino pyrimidine |
| XIX | 2-mercapto pyrimidine |

Although this invention has been illustrated by reference to specific embodiments, it will be apparent to those skilled in the art that various changes and modifications may be made which clearly fall within the scope of this invention.

We claim:

1. A lubricating oil composition containing a major portion of a lubricating oil and a minor effective amount of a polymer composition capable of use as a multifunctional viscosity index improver in lubricating oils, said polymer composition containing a carbon-carbon backbone and, graft polymerized onto said backbone, a graft monomer containing a carbon-carbon chain and an epoxide group spaced from said polymer carbon-carbon backbone, said graft monomer containing (i) a hydrocarbon chain or (ii) a hydrocarbon chain and an ester group or (iii) a hydrocarbon chain and an ether oxygen, said epoxide group having been functionalized with functionalizing reactant containing, as an active group, —NH$_2$, —NHR$^{iv}$, —OH, —COOH, or —SH wherein R$^{iv}$ is an alkyl, alkaryl, aralkyl, or cycloalkyl hydrocarbon group.

2. A lubricating oil composition as claimed in claim 1 wherein said functionalizing reactant is HXR′″ wherein X is —COO—, —S—, —NR$^{IV}$, or —O— and R′″ and R$^{IV}$ are alkyl, aralkyl, cycloalkyl, aryl, or alkaryl hydrocarbon groups.

3. A lubricating oil composition as claimed in claim 1 wherein said functionalizing reactant is
N-(3-aminopropyl) morpholine
2,6-dimethyl morpholine
2-amiono-3-picoline
4-amino-2,6-dimethyl pyrimidine
pyrimidine
N-hydroxyethyl piperazine
2-amino benzothiazole N-methyl piperazine
N-(3-aminopropyl)-2-pipecoline
pyrrolidine
N-(3-aminopropyl) pyrrolidone
2-amino pyrimidine
2-mercapto pyrimidine
3-methylmercapto aniline
1-(2-dimethylamino-ethyl) -5-mercapto-tetrazole
2,5-dimethylaniline
tetrazole-1-acetic acid
hydrogen sulfide
methyl mercaptan or
thiophenol.

4. A lubricating oil composition as claimed in claim 1 wherein said polymer composition containing a carbon-carbon backbone is a copolymer of ethylene-propylene or a terpolymer of ethylene-propylene-diene.

5. A lubricating oil composition as claimed in claim 1 wherein said graft monomer is an ether

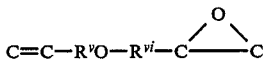

wherein $R^v$ and $R^{vi}$ are alkylene, aralkylene, alkarylene, cycloalkylene, or arylene divalent hydrocarbon groups.

6. A lubricating oil composition as claimed in claim 1 wherein said graft monomer is allyl glycidyl ether; 2-methallyl glycidyl ether; styrene-p-glycidyl ether; glycidyl methacrylate; p-glycidyl styrene; 3,4-epoxy-1-pentene; or 3,4-epoxy-1-butene.

7. A lubricating oil composition containining a major portion of a lubricating oil and a minor effective viscosity index improving amount of a polymer composition capable of use as an additive in lubricating oils, said polymer composition containing a carbon-carbon backbone derived from a copolymer of ethylene-propylene or a terpolymer, of ethylene-propylene-diene and graft polymerized onto said backbone, a graft monomer containing a carbon-carbon chain, said graft monomer containing (i) a hydrocarbon chain or (ii) a hydrocarbon chain and an ester group or (iii) a hydrocarbon chain and an ether oxygen, and an epoxide moiety which has been functionalized with 2,5-dimethyl aniline as a funtionalizing reactant.

8. A lubricating oil composition containing a major portion of a lubricating oil and a minor effective amount of a polymer composition capable of use as a multifunctional viscosity index improver in lubricating oils, said polymer composition containing a carbon-carbon backbone derived from a copolymer of ethylene-propylene-diene, and, graft polymerized onto said backbone, allyl glycidyl ether, the graft polymer being thereafter functionalized with 2,5-dimethyl aniline as functionalizing reactant.

* * * * *